United States Patent
Ogawa et al.

(10) Patent No.: US 11,981,808 B2
(45) Date of Patent: May 14, 2024

(54) INFRARED ABSORBING RESIN COMPOSITION, AND MOLDED ARTICLE AND FIBER CONTAINING SAME

(71) Applicant: Kyodo Printing Co., Ltd., Tokyo (JP)

(72) Inventors: Naoki Ogawa, Tokyo (JP); Fumihito Kobayashi, Tokyo (JP); Wataru Yoshizumi, Tokyo (JP); Kiyoshi Kitahara, Tokyo (JP); Ryo Takigawa, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 704 days.

(21) Appl. No.: 16/967,955

(22) PCT Filed: Feb. 15, 2019

(86) PCT No.: PCT/JP2019/005676
§ 371 (c)(1),
(2) Date: Aug. 6, 2020

(87) PCT Pub. No.: WO2019/160109
PCT Pub. Date: Aug. 22, 2019

(65) Prior Publication Data
US 2021/0032458 A1 Feb. 4, 2021

(30) Foreign Application Priority Data
Feb. 15, 2018 (JP) .................... 2018-025104

(51) Int. Cl.
*C08L 67/02* (2006.01)
*D01F 6/92* (2006.01)

(52) U.S. Cl.
CPC ............... *C08L 67/02* (2013.01); *D01F 6/92* (2013.01)

(58) Field of Classification Search
CPC combination set(s) only.
See application file for complete search history.

(56) References Cited

U.S. PATENT DOCUMENTS

| | | | |
|---|---|---|---|
| 2006/0008640 A1 | 1/2006 | Chonan et al. | |
| 2006/0110557 A1* | 5/2006 | Xia | ............ C08K 3/08 428/35.7 |
| 2006/0178254 A1 | 8/2006 | Takeda et al. | |
| 2008/0308775 A1* | 12/2008 | Yabuki | ............ D01F 6/62 252/587 |

FOREIGN PATENT DOCUMENTS

| | | |
|---|---|---|
| CN | 104669756 A | 6/2015 |
| EP | 1847635 A1 | 10/2007 |
| JP | 62-090315 A | 4/1987 |
| JP | 01-229900 A | 9/1989 |
| JP | 2000-336524 A | 12/2000 |
| JP | 2006-307383 A | 11/2006 |
| JP | 2007-002372 A | 1/2007 |
| JP | 2008-024902 A | 2/2008 |
| JP | 2008-223171 A | 9/2008 |
| JP | 2010-077575 A | 4/2010 |
| JP | 2011-026440 A | 2/2011 |
| WO | 2005/037932 A1 | 4/2005 |
| WO | 2005/087680 A1 | 9/2005 |

OTHER PUBLICATIONS

Datasheet for VORIDIAN 9921.*
Japanese Office Action dated Jan. 4, 2022 issued in Japanese Patent Application No. 2019-572297.
International Search Report in International Patent Application No. PCT/JP2019/005676, dated Mar. 26, 2019. English translation.
Written Opinion of the International Searching Authority issued in International Application No. PCT/JP2019/005676, dated Mar. 26, 2019, English translation.
International Preliminary Report on Patentability in International Patent Application No. PCT/JP2019/005676, dated Aug. 18, 2020, English translation.
European Search Report issued in EPO Patent Application No. 19755081.7, dated Nov. 12, 2021.

* cited by examiner

*Primary Examiner* — Robert T Butcher
(74) *Attorney, Agent, or Firm* — GREENBLUM & BERNSTEIN, P.L.C.

(57) ABSTRACT

The purpose of the present invention is to provide a resin composition comprising a tungsten-based pigment, and which enables the achievement of high infrared absorption and good moldability, and a molded article and a fiber, each of which contains the resin composition. The present invention relates to an infrared absorbing resin composition comprising a tungsten-based infrared absorbing pigment and a polyethylene terephthalate, and wherein the polyethylene terephthalate is a crystalline copolymerized polyethylene terephthalate which has an intrinsic viscosity of 0.60 or more, and a molded article and a fiber, each of which contains this absorbing resin composition.

8 Claims, 3 Drawing Sheets

(a)
EXAMPLE 6 (Normal camera)

(b)
EXAMPLE 6 (Infrared camera)

(c)
COMPARATIVE EXAMPLE 7
(Normal camera)

(d)
COMPARATIVE EXAMPLE 7
(Infrared camera)

(e)
COMPARATIVE EXAMPLE 8
(Normal camera)

(f)
COMPARATIVE EXAMPLE 8
(Infrared camera)

INFRARED ABSORBING RESIN COMPOSITION, AND MOLDED ARTICLE AND FIBER CONTAINING SAME

FIELD

The present invention relates to an infrared absorbing resin composition and a molded article and a fiber containing the same. In particular, the present invention relates to an infrared absorbing resin composition comprising a tungsten-based infrared absorbing pigment and a specific polyethylene terephthalate, and a molded article and a fiber using the same.

BACKGROUND

As an infrared absorber, a tungsten-based pigment is known. For example, Patent Document 1 uses a tungsten-based pigment to impart a solar radiation shielding function to a structure for solar radiation shielding. Further, Patent Document 2 discloses a resin composition comprising such a tungsten-based pigment. Further, Patent Document 3 discloses a resin composition comprising such a tungsten-based pigment and a polyester resin, and a molded article using the resin composition.

Patent Document 4 discloses a fiber spun from an infrared absorbing resin composition comprising polyethylene terephthalate and antimony oxide, and a fabric for preventing infrared transmission photography using the fiber.

CITATION LIST

Patent Literature

[PTL 1] WO 2005/087680
[PTL 2] JP-A-2008-024902
[PTL 3] JP-A-2011-026440
[PTL 4] JP-A-2010-077575

SUMMARY

Technical Problem

It is an object of the present invention to provide a resin composition comprising a tungsten-based pigment, which can provide high infrared absorption and good moldability, and a molded article and a fiber, each of which contains this resin composition.

Solution to Problem

The present inventors have found that the above problems can be solved by the present invention having the following aspects.

<Aspect 1> An infrared absorbing resin composition comprising a tungsten-based infrared absorbing pigment and polyethylene terephthalate, wherein said polyethylene terephthalate has an intrinsic viscosity of 0.60 or more and is a crystalline copolymerized polyethylene terephthalate.

<Aspect 2> The infrared absorbing resin composition according to aspect 1, wherein the polyethylene terephthalate has an intrinsic viscosity of 0.60 or more and 1.30 or less.

<Aspect 3> The infrared absorbing resin composition according to aspect 1 or 2, wherein the polyethylene terephthalate has a melting point of 210° C. or more and 240° C. or less.

<Aspect 4> The infrared absorbing resin composition according to any one of aspects 1 to 3, wherein the tungsten-based infrared absorbing pigment is selected from the group consisting of:

a composite tungsten oxide, which has a general formula (1): $M_xW_yO_z$, wherein M is one or more elements selected from the group consisting of H, He, an alkali metal elements, alkaline earth metal elements, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, 5, Se, Br, Te, Ti, Nb, V, Mo, Ta, Re, Be, Hf, Os, Bi, and I, W is tungsten, O is oxygen, x, y, and z are respectively positive numbers, and $0<x/y≤1$ and $2.2≤z/y≤3.0$, and, a tungsten oxides having a magneli phase, which has a general formula (2): $W_yO_z$, wherein W is tungsten, O is oxygen, y and z are respectively positive numbers, and $2.45≤z/y≤2.999$.

<Aspect 5> The infrared absorbing resin composition according to any one of aspects 1 to 4, further comprising a dispersant which is an acrylic polymer.

<Aspect 6> A molded article comprising an infrared absorbing resin composition according to any one of aspects 1 to 5.

<Aspect 7> A method for producing a molded article comprising molding an infrared absorbing resin composition according to any one of aspects 1 to 5.

<Aspect 8> A fiber comprising an infrared absorbing resin composition according to any one of aspects 1 to 5.

<Aspect 9> The fiber according to aspect 8, wherein the polyethylene terephthalate comprised in the infrared absorbing resin composition has an intrinsic viscosity of 0.60 or more and less than 0.80.

<Aspect 10> The fiber according to aspect 8 or 9, wherein said polyethylene terephthalate comprises isophthalic acid or an ester thereof as a third monomer.

<Aspect 11> A fabric comprising a fiber according to any one of aspects 8 to 10

DESCRIPTION OF EMBODIMENTS

<<Infrared Absorbing Resin Composition>>

Figure 1:
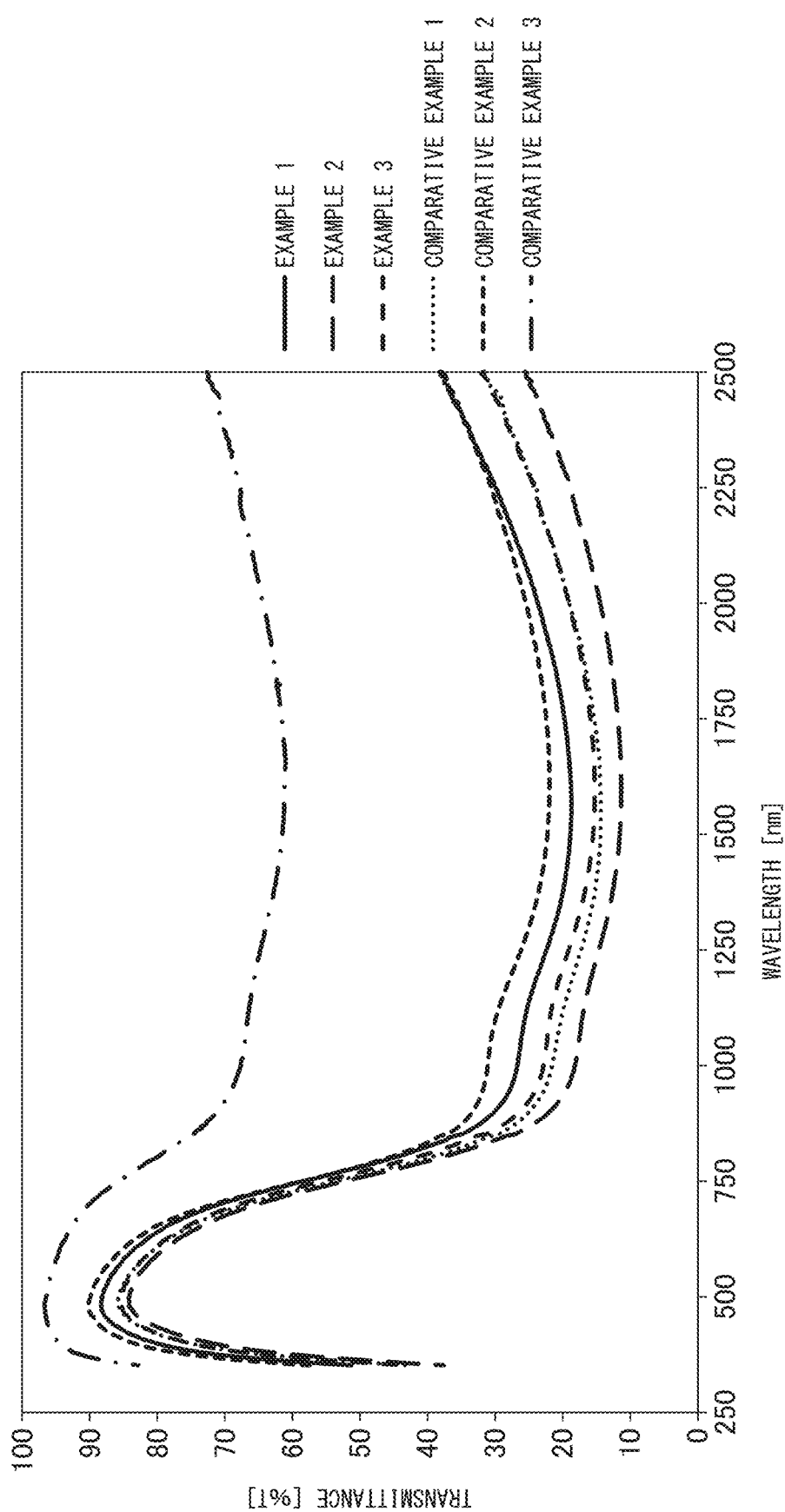
FIG. 1 shows the absorbance spectra in the range of UV-vis-NIR measured for the sheets of Examples and Comparative Examples.

The infrared absorbing resin composition of the present invention comprises a tungsten-based infrared absorbing pigment and polyethylene terephthalate. Here, the polyethylene terephthalate has an intrinsic viscosity of 0.60 or more and is a crystalline copolymerized polyethylene terephthalate.

The present inventors have found that, in an infrared absorbing resin composition comprising a tungsten-based infrared absorbing pigment and polyethylene terephthalate, when a copolymerized polyethylene terephthalate having an intrinsic viscosity of 0.60 or more and crystalline property is used as a polyethylene terephthalate, both high infrared absorption and good moldability can be exhibited.

Without being bound by theory, it is considered that, in the infrared absorbing resin composition of the present invention, since the polyethylene terephthalate has a specific intrinsic viscosity and is a crystalline copolymerized polyethylene terephthalate, it is possible to suppress the occurrence of unevenness at the time of processing of the resin composition, the fiber breakage at the time of spinning, and the like, and to enhance the dispersibility of the tungsten-based infrared absorbing pigment. It is considered that the reason why unevenness at the time of processing can be suppressed in the resin composition of the present invention is that, by using this specific polyethylene terephthalate, adverse effects due to volatile components generated from the resin composition can be suppressed. The infrared absorbing resin composition of the present invention can have high infrared absorption by highly dispersing a tungsten-based infrared absorbing pigment, and also has high moldability by suppressing the occurrence of unevenness during processing of the resin composition. Since the unevenness of the resin composition is related to the appearance defect, the insufficient strength, and the like of the molded article when the resin composition is molded, the molded article obtained by the infrared absorbing resin composition of the present invention is very advantageous.

<Tungsten-Based Infrared Absorbing Pigment>

Examples of the tungsten-based infrared absorbing pigment comprise particles of a tungsten oxide-based compound used in infrared absorbing applications.

For example, the tungsten-based infrared-absorbing pigment which can be used includes, a composite tungsten oxide, which has a general formula (1): $M_xW_yO_z$, wherein M is one or more elements selected from the group consisting of H, He, an alkali metal elements, alkaline earth metal elements, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, x, y, and z are respectively positive numbers, and $0<x/y\le1$ and $2.2\le z/y\le3.0$, and a tungsten oxides having a magneli phase, which has a general formula (2): $W_yO_z$, wherein W is tungsten, O is oxygen, y and z are respectively positive numbers, and $2.45\le z/y\le2.999$.

As a method for producing a tungsten-based infrared absorbing pigment, a method for producing a tungsten oxide having a composite tungsten oxide or a magneli phase described in JP-A 2005-187323 can be used.

In the composite tungsten oxide represented by Formula (1), an element M is added. Therefore, free electrons are generated including the case where $z/y=3.0$ in the general formula (1), absorption characteristics derived from free electrons are exhibited in the near-infrared light wavelength region, and the material is effective as a material that absorbs near-infrared rays near wavelength of 1000 nm.

In particular, from the viewpoint of improving optical characteristics and weather resistance as the near-infrared absorbing material, one or more of Cs, Rb, K, Tl, In, Ba, Li, Ca, Sr, Fe, and Sn can be used as the M element.

The composite tungsten oxide represented by Formula (1) may be treated with a silane coupling agent to enhance the near-infrared absorption and transparency in the visible light wavelength region.

If the value of x/y indicating the addition amount of the element M is more than 0, a sufficient amount of free electrons is generated, and a sufficient near-infrared absorption effect can be obtained. As the addition amount of the element M increases, the supply amount of free electrons increases and the near-infrared absorption effect also increases, but the value of x/y usually becomes saturated at about 1. When the value of x/y is 1 or less, the formation of an impurity phase in the pigment-containing layer may be prevented. The value of x/y may be 0.001 or more, 0.2 or more or 0.30 or more, may be 0.85 or less, 0.5 or less, or 0.35 or less. The value of x/y may in particular be 0.33.

In the general formulas (1) and (2), the value of z/y indicates the level of control of the amount of oxygen. Since the composite tungsten oxide represented by the general formula (1) satisfies a relationship in which a value of z/y is $2.2\le z/y\le3.0$, in addition to the same oxygen control mechanism as that of the tungsten oxide represented by the general formula (2) works, there is a supply of free electrons by the addition of the element M even when $z/y=3.0$ In the general formula (1), the value of z/y may satisfy the relationship of $2.45\le z/y\le3.0$.

When the composite tungsten oxide represented by the general formula (1) has a hexagonal crystal structure or is composed of a hexagonal crystal structure, the transmission in the visible light wavelength region of the infrared absorbing material fine particles is increased and the absorption of the near infrared light wavelength region is increased. When the positive ions of the element M are added to the hexagonal voids, the transmission in the visible light wavelength region is increased, and the absorption in the near infrared light wavelength region is increased. Hexagonal crystals are generally formed when an element M having a large ion radius is added. Specifically, when adding an element having a large ionic radius such as Cs, K, Rb, Tl, In, Ba, Sn, Li, Ca, Sr, and Fe, hexagonal is easily formed. However, the present invention is not limited to these elements, and elements other than these elements may be used as long as the additive element M exists in the hexagonal voids formed in $WO_6$ units.

When the composite tungsten oxide having a hexagonal crystal structure has a uniform crystal structure, the amount of the added element M to be added can be 0.2 or more and 0.5 or less at a value of x/y, and can be 0.30 or more and 0.35 or less, and can be particularly 0.33 When the value of x/y is 0.33, it is considered that the additive element M is disposed in substantially all of the hexagonal voids.

Except hexagonal, tetragonal or cubic tungsten bronze also has a near-infrared absorption effect. These crystal structures tend to change the absorption position of the near infrared light wavelength region, and the absorption position tends to move to the long wavelength side in the order of cubic<tetragonal<hexagonal. Also, less absorption in the visible light wavelength region associated therewith is in the order of hexagonal<tetragonal<cubic. Therefore, by further transmitting light in the visible light wavelength region, the application for more absorbing light in the near infrared light wavelength region, may be used a hexagonal tungsten bronze.

In the tungsten oxide having a magneli phase represented by the general formula (2), a so-called "magneli phase" having a composition ratio satisfying the relationship of z/y of $2.4.5\le z/y\le2.999$ is suitably used as a near-infrared absorbing pigment because of high stability and high absorption characteristics in the near-infrared wavelength region.

Since the pigment as described above largely absorbs light in the near-infrared light wavelength region, particularly in the vicinity of a wavelength of 1000 nm, there are many substances whose transmission tone changes from a blue color to a green color. In addition, the dispersed particle diameter of the tungsten-based infrared absorbing pigment can be selected depending on the purpose of use thereof.

First, when applied while retaining transparency, it is preferable to have a dispersed particle diameter of 2000 nm or less on a volume average. This is because, if the dispersed particle diameter is 2000 nm or less, the difference in the bottom between the peak of the transmittance (reflectance) in the visible light wavelength region and the absorption in the near infrared light wavelength region is increased, it is possible to exhibit the effect as a near infrared absorbing pigment having transparency in the visible light wavelength region. Further particles dispersed particle diameter is smaller than 2000 nm, it is not completely shielded light by scattering, to maintain the visibility of the visible light wavelength region, at the same time it is possible to maintain the transparency efficiently.

Further, when the transparency of the visible light wavelength region is emphasized, scattering by particles is preferably considered. Specifically, the dispersion particle diameter of the volume average of the tungsten-based infrared absorbing pigment is preferably 200 nm or less, more preferably 100 nm or less, 50 nm or less, or 30 nm or less. When the dispersed particle diameter of the infrared absorbing material fine particles is 200 nm or less, geometric scattering or Mie scattering is reduced, resulting in a Rayleigh scattering region. In the Rayleigh scattering region, the scattered light is reduced in inverse proportion to the sixth power of the dispersed particle diameter, so that with the decrease in the dispersed particle diameter, the scattering is reduced and the transparency is improved. Further, when the diameter of the dispersed particle is 100 nm or less, scattered light is very small, which is preferable. From the viewpoint of avoiding light scattering, it is preferable that the dispersed particle diameter be small. On the other hand, when the diameter of the dispersed particles is 1 nm or more, 3 nm or more, 5 nm or more, or 10 nm or more, industrial production tends to be easy. Here, the volume average dispersed particle diameter of the tungsten-based infrared absorbing pigment was measured using a microtrack particle size distributor (manufactured by Nikkiso Co., Ltd.) of a dynamic light scattering method in which a laser beam was irradiated to fine particles during Brownian motion and the particle diameter was obtained from light scattering information obtained therefrom.

The content of the tungsten-based infrared absorbing pigment in the resin composition may be 0.1% by weight or more, 0.5% by weight or more, 1.0% by weight or more, 2.0% by weight or more, or 3.0% by weight or more, and may be 20% by weight or less, 10% by weight or less, 8.0% by weight or less, 5.0% by weight or less, 3.0% by weight or less, or 1.0% by weight or less. For example, the content thereof may be 0.1% by weight or more and 20% by weight or less, or 0.5% by weight or more and 5.0% by weight or less.

<Polyethylene Terephthalate>

The polyethylene terephthalate comprised in the resin composition of the present invention has an intrinsic viscosity of 0.60 or more and is a crystalline copolymerized polyethylene terephthalate.

Intrinsic viscosity is a physical property value related to the molecular weight, branching degree, and the like of a polymer, and an intrinsic viscosity referred to herein is a value measured by a capillary viscometer according to JIS K 7367-5:2000.

The intrinsic viscosity of polyethylene terephthalate may be 0.60 or more, 0.65 or more, 0.70 or more, 0.75 or more, 0.80 or more, 0.85 or more, 0.90 or more, 0.95 or more, 1.00 or more, or 1.10 or more, and may be 1.30 or less, 1.25 or less, 1.20 or less, 1.15 or less, 1.10 or less, 1.05 or less, 1.00 or less, 0.95 or less, 0.90 or less, 0.85 or less, 0.80 or less, 0.75 or less, or 0.70 or less. By having such an intrinsic viscosity of polyethylene terephthalate, it is considered that the dispersibility of the tungsten-based infrared absorbing pigment can be increased. For example, the intrinsic viscosity thereof may be 0.60 or more and 1.30 or less, and particularly, when the resin composition of the present invention is made into a fiber, it is preferably 0.60 or more and 0.80 or less.

Since its polyethylene terephthalate has crystallinity, a clear peak of melting point is observed when measured by differential scanning calorimetry. The melting point of polyethylene terephthalate may be 210° C. or more, 215° C. or more, 220° C. or more, 225° C. or more, or 230° C. or more, and may be 240° C. or less, 235 CC or less, 230° C. or less, or 225° C. or less. By having such a melting point of polyethylene terephthalate, a molded article can be molded under appropriate temperature conditions. For example, its melting point may be 210° C. or more and 240° C. or less, or 215° C. or more and 235° C. or less. Within such a range, processing of the resin composition can be performed at a temperature at which volatile components are hardly generated, and occurrence of unevenness at the time of processing of the resin composition, fiber breakage at the time of spinning, and the like can be easily suppressed.

The polyethylene terephthalate is a copolymerized polyethylene terephthalate. In this specification, the copolymerized polyethylene terephthalate refers to a polyethylene terephthalate obtained by copolymerizing not only ethylene glycol as a diol component and terephthalic acid or an ester thereof as a dicarboxylic acid component but also using a third monomer. Although polyethylene terephthalate tends to be amorphous by comprising a third monomer, the polyethylene terephthalate used in the present invention is only crystalline among copolymerized polyethylene terephthalates comprising a third monomer, and the present inventors have found that an advantageous effect can be provided only when such a crystalline copolymerized polyethylene terephthalate is used.

Here, as the third monomer, as long as the obtained polyethylene terephthalate is crystalline and thereby the advantageous effect of the present invention is obtained, there is no particular limitation, and examples thereof include aliphatic diols such as propylene glycol, butanediol, hexanediol, octanediol, decanediol, neopentyl glycol; alicyclic diols such as 1,4-cyclohexanedimethanol; aromatic diols such as bisphenol A, bisphenol S and the like or ethylene oxide adducts thereof; or triols thereof such as trimethylolpropane. These diol components may be used in a range of 20 mol % or less, 10 mol % or less, or 5 mol % or less.

Further, as the third monomer, as long as the obtained polyethylene terephthalate is crystalline and thereby the advantageous effect of the present invention is obtained, there is no particular limitation, and examples thereof comprise aliphatic dicarboxylic acids such as malonic acid, succinic acid, glutaric acid, adipic acid, sebacic acid, and azelaic acid; alicyclic dicarboxylic acids such as 1,4-cyclohexanedicarboxylic acid; aromatic dicarboxylic acids such as phthalic acid, isophthalic acid, and 2,6-naphthalenedicarboxylic acid; and salts thereof such as sodium sulfoisophthalate, and esters thereof. Among these, it has been found that, in particular, copolymerized polyethylene terephthalate using isophthalic acid or an ester thereof as a third monomer is preferable. These dicarboxylic acid components may be used in a range of 20 mol % or less, 10 mol % or less, or 5 mol % or less.

The polyethylene terephthalate may be comprised in the infrared absorbing resin composition at 50% by mass or more, 60% by mass or more, 70% by mass or more, 80% by mass or more, 90% by mass or more, or 95% by mass or more, and may be comprised in 99% by mass or less, 98% by mass or less, 95% by mass or less, 93% by mass or less, 90% by mass or less, 85% by mass or less, 80% by mass or less, or 75% by mass or less. For example, the content thereof may be 70% by mass or more and 99% by mass or less, or 80% by mass or more and 98% by mass or less.

<Dispersant>

The infrared absorbing resin composition of the present invention may comprise a dispersant for highly dispersing the tungsten-based infrared absorbing pigment in the polyethylene terephthalate described above. The dispersant which can be used can be selected depending on the type of the tungsten-based infrared absorbing pigment, but a dispersant which is an acrylic polymer, for example, a polymer dispersant having an acrylic main chain and a hydroxyl group or an epoxy group can be used. As such a dispersant, for example, a dispersant as described in Patent Document 2 can be mentioned.

The dispersant may be comprised in the infrared absorbing resin composition in an amount of 0.1 parts by mass or more, 0.5 parts by mass or more, 1 parts by mass or more, 3 parts by mass or more, 5 parts by mass or more, or 10 parts by mass or more based on 1 parts by mass of the tungsten-based infrared absorbing pigment, and may be comprised in the infrared absorbing resin composition in an amount of 30 parts by mass or less, 20 parts by mass or less; 10 parts by mass or less, 5 parts by mass or less, 3 parts by mass or less, 1 parts by mass or less, 0.5 parts by mass or less, or 0.1 parts by mass or less. For example, the amount thereof may be 0.5 parts by mass or more and 10 parts by mass or less, or 1 parts by mass or more and 5 parts by mass or less, per 1 parts by mass of the tungsten-based infrared absorbing pigment.

<Other Components>

The infrared absorbing resin composition of the present invention may further comprise other thermoplastic resins within a range in which the advantageous effect of the present invention is obtained. Examples of such a thermoplastic resin comprise polyolefin-based resins, polystyrene-based resins, polyester-based resins, acrylic resins, polyamide-based resins, polyvinyl alcohol-based resins, polyurethane-based resins, polyolefin-based resins, polycarbonate resins, polysulfone resins, and derivatives thereof, and mixtures thereof.

The infrared absorbing resin composition of the present invention may further c comprise various additives such as an antioxidant, a plasticizer, a colorant, a pigment, a filler, and the like within a range in which an advantageous effect of the present invention is obtained.

<Molded Articles>>

The molded article of the present invention contains the infrared absorbing resin composition described above. The molded article of the present invention is very suitable because the generation of unevenness during molding is very small.

Examples of the molded article of the present invention comprise molded articles obtained by various molding methods such as injection molding, extrusion molding, and blow molding. Further, as the molded article of the present invention, a sheet-like form obtained by hot pressing or the like may be used. Such a molded article may be a three-dimensional molded article, a film, a sheet, or the like, and may be various products such as, for example, packaging containers, building materials, automobile parts, mechanical parts, a daily commodities, or the like.

<<Method for Producing Molded Articles>>

The method for producing a molded article of the present invention comprises molding the above-described infrared absorbing resin composition at a temperature of 230° C. to 260° C. For example, a method of manufacturing a molded article of the present invention may comprise kneading an infrared absorbing resin composition described above to obtain a master batch, and molding the master batch.

For example, before molding a molded article, a material obtained by kneading a material comprised in the above-mentioned infrared absorbing resin composition is extruded into a pellet form and cooled, whereby an infrared absorbing resin composition (masterbatch) in a pellet form can be produced.

In this case, kneading can be performed using, for example, a batch type kneader such as a kneader, a Banbury mixer, a Henschel mixer, a mixing roll, or a continuous kneader such as a twin-screw extruder or a single-screw extruder. In this case, the kneading can be carried out at the above-mentioned molding temperature, that is, at a temperature of 230° C. to 260° C., depending on the materials used.

The molded article of the present invention can be produced by molding the master batch thus obtained by a known molding method such as injection molding, extrusion molding, or blow molding. Further, a molded article in a sheet-like form may be produced by performing thermal pressing or the like on the infrared absorbing resin composition kneaded as described above.

<<<Fiber>>

The fibers of the present invention can be obtained, for example, by melt spinning the infrared absorbing resin composition as described above. In melt spinning, it is possible to use a commonly used melt spinning apparatus.

When fibers are produced by melt spinning, it has been found that the intrinsic viscosity of polyethylene terephthalate used in the infrared absorbing resin composition is particularly preferably 0.60 or more and less than 0.80 In particular, it has been found that the polyethylene terephthalate used in the infrared absorbing resin composition is preferably a crystalline copolymerized polyethylene terephthalate comprising isophthalic acid or an ester thereof as a third monomer.

The fibers of the present invention may be spun from only a resin composition as described above, and the fibers of the present invention may comprise 50% by weight or more, 60% by weight or more, 70% by weight or more, 80% by weight or more, 90% by weight or more, or 95% by weight or more of a resin composition as described above, and may also comprise 98% by weight or less, 95% by weight or less, 90% by weight or less, 80% by weight or less, or 70% by weight or less.

The fibers of the present invention may have well-known characteristics other than such characteristics, for example, as described in Patent Document 4 described above.

<<Method for Producing Fibers>>

The method for producing fibers of the present invention comprises melt-kneading an infrared absorbing resin composition as described above, and melt-spinning the melt-kneaded resin composition.

For example, before the fibers are spun, a material obtained by kneading a material comprised in the above-mentioned infrared absorbing resin composition is extruded into a pellet form and cooled, whereby an infrared absorbing resin composition (masterbatch) in a pellet form can be produced.

In this case, kneading can be performed using, for example, a batch type kneader such as a kneader, a Banbury mixer, a Henschel mixer, a mixing roll, or a continuous kneader such as a twin-screw extruder or a single-screw extruder, in this case, it can be kneaded at a temperature of, for example, 230° C. to 260° C. depending on the material to be used.

<<Fabric>>

The fabric of the present invention comprises fibers as described above. According to studies conducted by the present inventors, it has been found that, since such a fabric has a higher infrared absorbing property than a fabric made of a fiber comprising another infrared absorbing material as used in the prior art, stealing by an infrared camera can be more effectively prevented.

In addition, it is known that tungsten-based infrared absorbing pigments have high photothermal convertibility, and the temperature rises when they absorb infrared rays. Therefore, the fabric of the present invention comprising a tungsten-based infrared absorbing pigment can have a high temperature raising effect when infrared rays are absorbed. As a result, the fabric of the present invention can also have fast drying property.

In order to take advantage of such characteristics, it is preferable that the fabric of the present invention has many fibers of the present invention as described above placed on the surface exposed in use. For example, in the case of the fabric of the present invention in which the fibers of the present invention are woven in a 3/1 twill weave using only a weft yarn, it is possible to increase the temperature raising effect when the surface appearing on the 75% surface is brought into the exposed surface rather than the surface appearing on the 25% surface. On the other hand, when only the anti-theft property is considered, it is not necessary to arrange the fibers of the present invention on the exposed surface of the fabric.

The fabric of the present invention may be composed solely of fibers as described above, and the fabric of the present invention may comprise 50% by weight or more, 60% by weight or more, 70% by weight or more, 80% by weight or more, 90% by weight or more, or 95% by weight or more of fibers as described above, and may also comprise 98% by weight or less, 95% by weight or less, 90% by weight or less, 80% by weight or less, or 70% h weight or less.

The fabric of the present invention may have well-known characteristics other than such characteristics, for example, as described in Patent Document 4 described above.

The present invention will be described further specifically in the following examples, but the present invention is not limited thereto.

EXAMPLES

Experiment A: Evaluation of Sheets

Example of Manufacturing

Example 1

95% by mass of a crystalline copolymerized PET (Bellpet IFG8L, manufactured by Bell Polyester Products Inc.) having an intrinsic viscosity (IV)=0.80 as polyethylene terephthalate (PET), and 5% by mass of a cesium tungsten oxide treated with a dispersant (Cesium tungsten oxide 1% by mass+dispersant 4% by mass) (CWO (trademark): YMDS-874, manufactured by Sumitomo Metal Mining Co., Ltd.) as tungsten-based infrared absorbing pigment were kneaded in a mixer kneader to obtain an infrared absorbing resin composition of Example 1. Note that, as for the PET used here, isophthalic acid was used as a third monomer.

The resin composition was formed into a sheet by a hot press to obtain an infrared absorbing resin sheet having a thickness of 50 μm.

Example 2

An infrared absorbing resin composition and an infrared absorbing resin sheet of Example 2 were obtained in the same manner as in Example 1, except that a crystalline copolymerized PET (BELLPET IP121B, manufactured by Bell Polyester Products Inc.) having an intrinsic viscosity (IV)=0.62 was used as PET. Note that, as for the PET used here, isophthalic acid was used as a third monomer.

Example 3

An infrared absorbing resin composition and an infrared absorbing resin sheet of Example 3 were obtained in the same manner as in Example 1, except that a crystalline copolymerized. PET (KURAPET KS710B-8S, manufactured by Kuraray Co., Ltd.) having an intrinsic viscosity (IV)=1.20 was used as PET, Note that, as for the PET used here, an ethylene oxide adduct of bisphenol A was used as a third monomer.

Comparative Example 1

An infrared absorbing resin composition and an infrared absorbing resin sheet of Comparative Example 1 were obtained in the same manner as in Example 1, except that PET (BELLPET EFG85A, manufactured by Bell Polyester Products Inc.) having an intrinsic viscosity (IV)=0.87 was used as PET. Note that the PET used here was a homoPET produced by using ethylene glycol and terephthalic acid as monomers.

Comparative Example 2

An infrared absorbing resin composition and an infrared absorbing resin sheet of Comparative Example 2 were obtained in the same manner as in Example 1, except that an amorphous PET (BELLPET E-03, manufactured by Bell Polyester Products Inc.) having an intrinsic viscosity (IV) =083 was used as PET. Note that, as for the PET used here, neopentyl glycol has been used as a third monomer.

Comparative Example 3

An infrared absorbing resin composition and an infrared absorbing resin sheet of Comparative Example 3 were obtained in the same manner as in Example 1, except that PET (BELLPET IP140B, manufactured by Bell Polyester Products Inc.) having an intrinsic viscosity (IV)=0.58 was used as PET. Note that, as for the PET used here, isophthalic acid was used as a third monomer.

Comparative Example 4

An infrared absorbing resin composition and an infrared absorbing resin sheet of Comparative Example 4 were obtained in the same manner as in Example 1, except that it was not used cesium tungsten oxide ($Cs_{0.33}WO_3$) which is a tungsten-based infrared absorbing pigment.

<<Evaluation>>
<Uniformity>

Visual uniformity of the infrared absorbing resin sheet of each example was evaluated. Evaluation was regarded as "poor" when there was unevenness of blue shade caused by the CWO (trademark) in the appearance of the sheets, and evaluation was regarded as "good" in other cases. In Comparative Example 4, since the CWO (trademark) was not kneaded, evaluation was regarded "N/A".

<Light Absorption>

UV-vis-NIR absorption spectra of the infrared absorbing resin sheets of the examples were measured, and the total light transmittance and the smallest transmittance (NIR transmittance) in the near-infrared region (800-2500 nm) were evaluated. A spectrophotometer UH4150 (JIS K 0115: 2004 compliant) manufactured by Hitachi High-Technology Science was used as the measuring device.

<Processability>

Since it is related to defective appearance, insufficient strength, and the like of a molded article molded using a resin composition, the processability of the resin composition was evaluated by the unevenness of its surface. As the evaluation method, the surface of the resin composition was observed with a digital microscope (hybrid laser microscope OPTELICS manufactured by Lasertec Corporation), to measure the area ratio of the concave portion in the region of 25 μm×25 μm. Evaluation was regarded as "good" when it is less than 5%, and evaluation was regarded as "poor" in the case of 5% or more. Here, the "concave portion" was defined as a region represented in black by binarizing a color image obtained by observing with a digital microscope.

<<Results>>

The configuration of the infrared absorbing resin sheet of each of the above examples and evaluation results are shown in the following table. UV-vis-NIR absorption spectrum of the infrared-ray absorption property is shown in FIG. 1.

Experiment B: Evaluation of Fibres and Fabrics

Example of Manufacturing

Example 4

A crystalline Copolymerized PET having intrinsic viscosity (IV)=0.80 (Bellpet IFG8L, manufactured by Bell Polyester Products Inc.) and a crystalline copolymerized PET having intrinsic viscosity (IV)=0.62 (Bellpet IP121B, manufactured by Bell Polyester Products Inc.) were mixed to obtain crystalline copolymerized PET having corresponding to intrinsic viscosity (IV)=0.77. 95% by mass of the crystalline copolymerized PET and 5% by mass of a cesium tungsten oxide treated with a dispersant (Cesium tungsten oxide 1.15% by mass+dispersant 3.85% by mass) (CWO (trademark): YMDS-874, manufactured by Sumitomo Metal Mining Co., Ltd.) as tungsten-based infrared absorbing pigment were kneaded in a twin-screw extruder to obtain an infrared absorbing resin composition. Note that, as for the PET used here, isophthalic acid was used as a third monomer.

Further, this resin composition was fiberized in a multifilament melt spinning apparatus to obtain a fiber of Example 4 having a thickness of 75 denier for 24 filaments. At the time of spinning, spinning was performed at a temperature of 290° C., an extrusion amount of 4 kg/h, and a take-off speed of 1500 m/min, for 1 hour.

Example 5

Fibers were spun in the same manner as in Example 4, except that only a crystalline copolymerized PET (Bellpet IP121B, manufactured by Bell Polyester Products Inc.) having an intrinsic viscosity (IV)=0.62 was used.

Example 6

A fiber was spun in the same manner as in Example 4, except that a crystalline copolymerized PET (Bellpet IP121B, manufactured by Bell Polyester Products Inc.) having an intrinsic viscosity (IV)=0.62 was set to 97.5% by mass, and a cesium tungsten oxide treated with a dispersant

TABLE 1

| | | EXAMPLE 1 | EXAMPLE 2 | EXAMPLE 3 | COMPARATIVE EXAMPL 1 | COMPARATIVE EXAMPL 2 | COMPARATIVE EXAMPL 3 | COMPARATIVE EXAMPL 4 |
|---|---|---|---|---|---|---|---|---|
| PET | Type | Crystalline Copolymerized | Crystalline Copolymerized | Crystalline Copolymerized | Crystalline Homo | Amorphous Copolymerized | Crystalline Copolymerized | Crystalline Copolymerized |
| | Intrinsic viscosity | 0.80 | 0.62 | 1.20 | 0.87 | 0.83 | 0.58 | 0.80 |
| | Melting point | 224 | 224 | 233 | 255 | None | 220 | 224 |
| CWO (trademark) | Existence | Yes | Yes | Yes | Yes | Yes | Yes | None |
| Evaluation | Uniformity | Good | Good | Good | Good | Good | Poor | N/A |
| | Light absorption Total light transmittance | 76 | 78 | 78 | 75 | 80 | Poor | 91 |
| | NIR transmittance | 18 | 11 | 15 | 14 | 21 | 61 | 100 |
| | Processability | Good | Good | Good | Poor | Poor | Good | Good |
| | Overall results | Good | Good | Good | Poor | Poor | Poor | Poor |

It has been found that an infrared absorbing resin composition having both good processability and good light absorption can be obtained only when copolymerized PETs having an intrinsic viscosity of 0.60 or more and crystalline property were used.

(Cesium tungsten oxide 0.58% by mass+dispersant 1.92% by mass) (CWO (trademark): YMDS-874, manufactured by Sumitomo Metal Mining Co., Ltd.) was set to 2.5% by mass.

In addition, two of fiber were twisted combined to form a twin yarn equivalent to 150 denier. Using the twin yarn as a weft yarn, a fabric having a basis weight 170 g/m² was obtained by weaving in a 3/1 twill weave in a tongue-hell type loom. This fabric was a polyester/wool mixed fabric, and the mixing ratio of its weft yarn was 41%, and the warp yarn was 50:50 in polyester/wool, 250 denier, and 59% in mixing ratio.

Comparative Example 5

Fibers were spun in the same manner as in Example 4, except that a crystalline homoPET (Bellpet PBK1, manufactured by Bell Polyester Products Inc.) having an intrinsic viscosity (IV)=0.65 was used as PET.

Comparative Example 6

Fibers were spun in the same manner as in Example 4, except that a crystalline copolymerized PET (Bellpet IP140B, manufactured by Bell Polyester Products Inc.) having an intrinsic viscosity (IV)=0.58 was used as PET.

Comparative Example 7

Except that cesium tungsten oxide ($Cs_{0.33}WO_3$), which is a tungsten-based infrared absorbing pigment, was not used, fibers were spun in the same manner as in Example 6 to obtain a fabric.

Comparative Example 8

A commercially available fabric for preventing infrared rays from being photographed (DIASIELD (trademark), Mitsubishi Corporation Fashion Co., Ltd.) using fibers spun from an infrared absorbing resin composition comprising polyethylene terephthalate and antimony oxide was prepared. Note that the basis weight and thickness of this fabric were equivalent to those of the fabric of Example 6.

Comparative Example 9

When an investigation was made into fiberization in a multifilament melt spinning apparatus using the infrared absorbing resin composition of Example 1 of Experiment A, it was found that it was difficult to finely wound up fibers during melt spinning. This composition, although useful for sheets, was unsuitable for textile use.

<<Evaluation>>
<Suitability for Melt Spinning>

The melt spinning suitability of the resin composition was evaluated. When fiber breakage occurred during melt spinning, melt spinning suitability was set to "poor", and other cases were set to "good".

<Anti-Theft Properties>

A sample of fabric was placed on the plate on which the image was printed, and was photographed by transmission with an infrared camera, and the presence or absence of transmission was judged by checking the image. In comparison between normal photographing with the camera and infrared photographing, the case in which the visibility of the image is deteriorated in infrared photographing was set as "good", and the other cases were set as "poor".

<<Results>>

Figure 2:
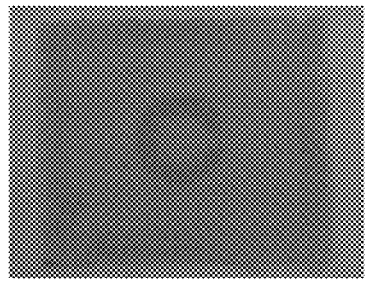
FIG. 2 shows the photographed images of the fabrics of Example 6, Comparative Example 7 and Comparative Example 8.
Figure 2:
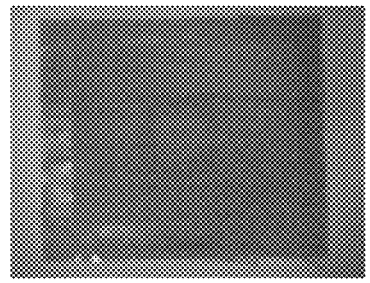
Figure 2:
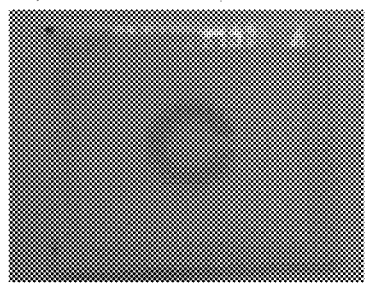
Figure 2:
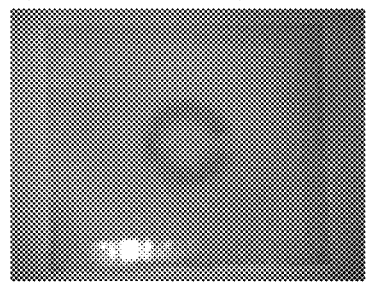
Figure 2:
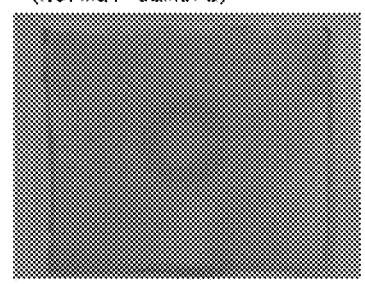
Figure 2:
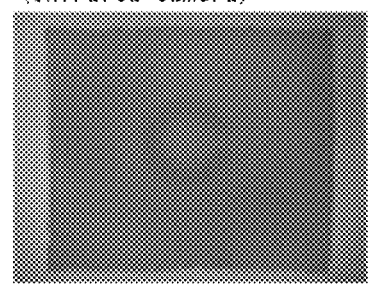
Figure 3:
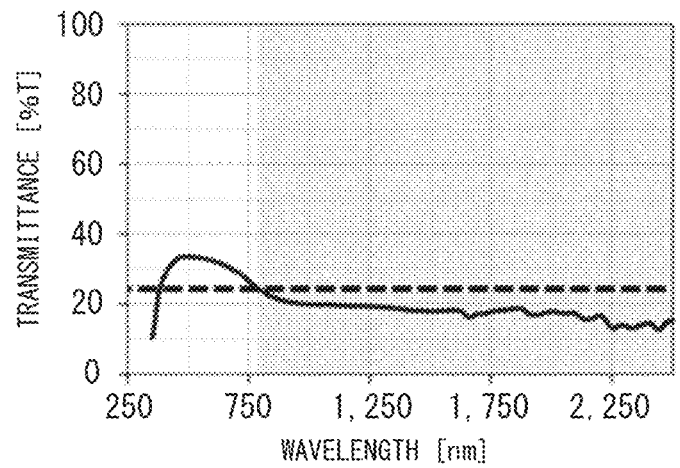
FIG. 3 shows the transmission spectra of the fabrics of Example 6, Comparative Example 7 and Comparative Example 8.
Figure 3:
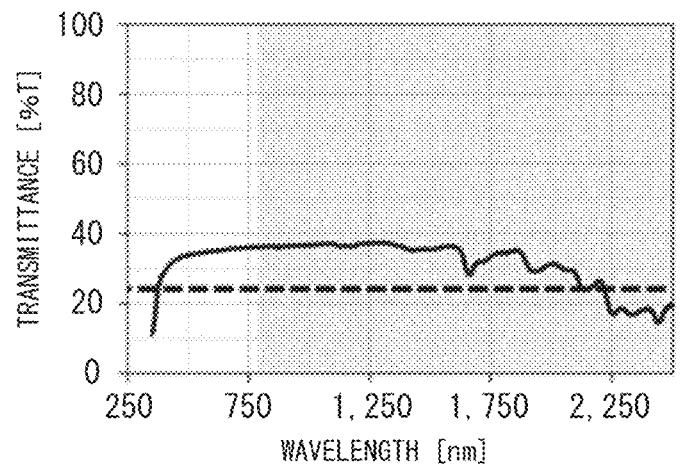
Figure 3:
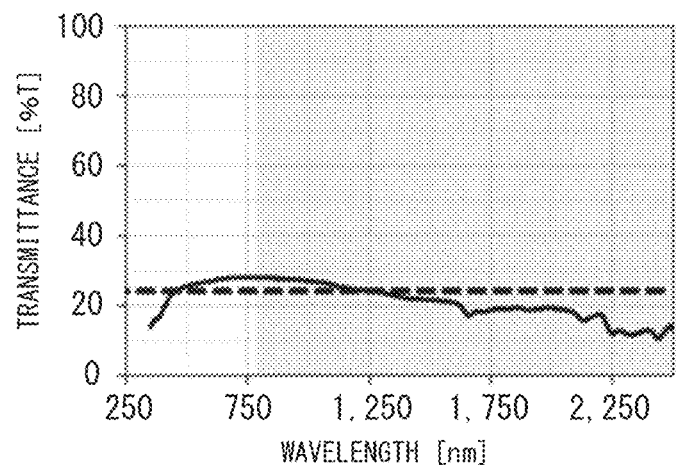

The configuration of each of the above examples and evaluation results are shown in the following table. Further, the photographed images and transmission spectra of the fabrics of Example 6, Comparative Example 7, and Comparative Example 8 are shown in FIGS. 2 and 3.

TABLE 2

| | | EXAMPLE 4 | EXAMPLE 5 | EXAMPLE 6 | COMPARATIVE EXAMPL 5 | COMPARATIVE EXAMPL 6 | COMPARATIVE EXAMPL 7 | COMPARATIVE EXAMPL 8 | COMPARATIVE EXAMPL 9 |
|---|---|---|---|---|---|---|---|---|---|
| PET | Type | Crystalline Copolymerized | Crystalline Copolymerized | Crystalline Copolymerized | Crystalline Homo | Crystalline Copolymerized | Crystalline Copolymerized | N/A N/A | Crystalline Copolymerized |
| | Intrinsic viscosity | 0.77 | 0.62 | 0.62 | 0.65 | 0.58 | 0.62 | N/A | 0.80 |
| CWO (trademark) | % by mass | 5.0 | 5.0 | 2.5 | 5.0 | 5.0 | 0 | 0 | 5.0 |
| Evaluation | Suitability for melt spinning | Good | Good | Good | Poor | Poor | Poor | N/A | Poor |
| | Anti-theft properties | N/A | N/A | Good | N/A | N/A | N/A | Poor | N/A |
| | Overall results | Good | Good | Good | Poor | Poor | Poor | Poor | Poor |

It has been found that a fabric having both good melt spinnability and good anti-theft property can be obtained only when copolymerized PETs having an intrinsic viscosity of 0.60 or more and less than 0.80 and crystalline property were used. In particular, it can be seen that the fabric of Example 6 is superior in anti-theft property at its wavelength because of its lower transmittance of 800 to 1500 nm than that of the fabric of Comparative Example 8 of the prior art. As in the fabric of Example 6, when the transmittance of 800 to 1500 nm is 25% or less, the anti-theft property is very high, and such a fabric is particularly useful.

The invention claimed is:

1. An infrared absorbing resin composition comprising a tungsten-based infrared absorbing pigment and polyethylene terephthalate, wherein said polyethylene terephthalate has an intrinsic viscosity of 0.85 or more and is a crystalline copolymerized polyethylene terephthalate;

wherein the tungsten-based infrared absorbing pigment is selected from the group consisting of:

a composite tungsten oxide, which has a general formula (1): $M_xW_yO_z$, wherein M is one or more elements selected from the group consisting of H, He, an alkali metal elements, alkaline earth metal elements, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, x, y, and z are respectively positive numbers, and $0 < x/y \le 1$ and $2.2 \le z/y \le 3.0$, and, a tungsten oxide having a magneli phase, which has a general formula (2): $W_yO_z$, wherein W is tungsten, O is oxygen, y and z are respectively positive numbers, and $2.45 \leq z/y \leq 2.999$, and the polyethylene terephthalate comprises an ethylene oxide adduct of bisphenol A as a third monomer.

2. The infrared absorbing resin composition according to claim 1, wherein the polyethylene terephthalate has an intrinsic viscosity of 0.85 or more and 1.30 or less.

3. The infrared absorbing resin composition according to claim 1, wherein the polyethylene terephthalate has a melting point of 210° C. or more and 240° C. or less.

4. The infrared absorbing resin composition according to claim 1, further comprising a dispersant which is an acrylic polymer.

5. A molded article comprising the infrared absorbing resin composition according to claim 1.

6. A method for producing a molded article comprising molding the infrared absorbing resin composition according to claim 1.

7. A fiber comprising the infrared absorbing resin composition according to claim 1.

8. A fabric comprising the fiber of claim 7.

* * * * *